(12) United States Patent
Kajikawa et al.

(10) Patent No.: US 11,407,068 B2
(45) Date of Patent: Aug. 9, 2022

(54) FLUX COMPOSITION, SOLDER PASTE, SOLDER JOINT AND SOLDER JOINING METHOD

(71) Applicant: Senju Metal Industry Co., Ltd., Tokyo (JP)

(72) Inventors: Yasuhiro Kajikawa, Tochigi (JP); Hiroyoshi Kawasaki, Tokyo (JP); Hiroshi Sugii, Tochigi (JP); Yoshinori Hiraoka, San Jose, CA (US)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 17/261,072

(22) PCT Filed: Aug. 1, 2019

(86) PCT No.: PCT/JP2019/030153
§ 371 (c)(1),
(2) Date: Jan. 18, 2021

(87) PCT Pub. No.: WO2020/031825
PCT Pub. Date: Feb. 13, 2020

(65) Prior Publication Data
US 2021/0245306 A1    Aug. 12, 2021

(30) Foreign Application Priority Data
Aug. 10, 2018  (JP) .............................. JP2018-151854

(51) Int. Cl.
*B23K 35/00*   (2006.01)
*B23K 35/36*   (2006.01)
(Continued)

(52) U.S. Cl.
CPC ........ *B23K 35/3613* (2013.01); *B23K 35/025* (2013.01); *B23K 35/362* (2013.01)

(58) Field of Classification Search
CPC ....... H04L 2924/00; H04L 2924/00014; H04L 2924/0105; H04L 2924/01047;
(Continued)

(56) References Cited

U.S. PATENT DOCUMENTS 5,851,311 A * 12/1998 Diamant ............ B23K 35/3613
148/23
6,590,287 B2 * 7/2003 Ohuchi .................. H01L 24/83
257/738
(Continued)

FOREIGN PATENT DOCUMENTS

CN    101232967 A    7/2008
CN    101733585 A    6/2010
(Continued)

OTHER PUBLICATIONS

CN-106281171-A computer translation (Year: 2021).*
(Continued)

*Primary Examiner* — Erin B Saad
(74) *Attorney, Agent, or Firm* — The Webb Law Firm

(57) ABSTRACT

Provided are a flux composition that is applicable without any film formation step, and solder paste, a solder joint and a solder joining method using the flux composition. The flux composition contains 20 wt % or more and 50 wt % or less of an epoxy resin, 15 wt % or more and 45 wt % or less of diallyl bisphenol A, and 1 wt % or more and 30 wt % or less of organic acid.

16 Claims, 3 Drawing Sheets

(51) Int. Cl.
*B23K 35/02* (2006.01)
*B23K 35/362* (2006.01)

(58) Field of Classification Search
CPC ... H04L 2924/0132; H04L 2224/13111; H04L 2224/16225; H04L 2224/32225; H04L 2224/73204; H04L 2924/0665; H04L 2924/01029; H04L 2924/01082; H04L 2224/83101; H04L 2224/83191; H04L 2224/2919; H04L 2924/01083; H04L 2224/16145; H04L 2224/32145; H04L 2224/94; H04L 2924/0001; H04L 2924/00013; H04L 2924/01049; H04L 2924/0133; H04L 2924/10253; H04L 2924/12042; H04L 2924/15311; H04L 2924/181; H04L 2224/29099; H04L 2224/0555; H04L 2224/0556; H04L 2224/05599; H04L 2224/13109; H04L 2224/81; H04L 2924/014; H04L 2924/3512; H04L 2924/01019; H04L 24/29; H04L 2924/01005; H04L 2924/01006; H04L 2924/01015; H04L 2924/01027; H04L 2924/01033; H04L 2924/01045; H04L 2924/01078; H04L 2924/14; H04L 2224/0554; H04L 2224/05573; H04L 2224/13025; H04L 2224/13099; H04L 2224/16235; H04L 2224/274; H04L 2224/29101; H04L 2224/29109; H04L 2224/29111; H04L 2224/73104; H04L 2224/81203; H04L 2224/81801; H04L 2224/83855; H04L 2225/06513; H04L 2225/06517; H04L 2225/06541; H04L 23/481; H04L 24/11; H04L 24/16; H04L 24/27; H04L 24/81; H04L 24/83; H04L 24/94; H04L 25/0657; H04L 25/50; H04L 2924/0103; H04L 2924/01051; H04L 2924/01059; H04L 2924/01072; H04L 2924/01075; H04L 2924/01077; H04L 2924/01327; H04L 2924/0781; H04L 2924/07811; H04L 2924/12041; H04L 2924/15747; H04L 2924/15788; H04L 21/563; H04L 2224/29199; H04L 2224/2929; H04L 2224/29299; H04L 2924/01079; H04L 2224/16; H04L 2224/29; H04L 2224/29298; H04L 2224/73203; H04L 23/293; H04L 23/295; H04L 2924/01004; H04L 2924/01023; H04L 2924/01056; H04L 2924/01074; H04L 2924/01322
See application file for complete search history.

(56) References Cited

U.S. PATENT DOCUMENTS

| | | | |
|---|---|---|---|
| 7,009,009 B1* | 3/2006 | Crane | H01L 24/29 525/122 |
| 8,227,536 B2 | 7/2012 | Watanabe et al. | |
| 9,431,314 B2 | 8/2016 | Enomoto et al. | |
| 2001/0019075 A1* | 9/2001 | Abe | B23K 35/3618 228/248.1 |
| 2002/0095783 A1* | 7/2002 | Kirsten | H01L 24/73 29/841 |
| 2008/0265438 A1 | 10/2008 | Asano | |
| 2009/0215961 A1* | 8/2009 | Bongiovanni | C08K 5/06 525/132 |
| 2010/0129960 A1* | 5/2010 | Mejima | H01L 24/29 438/107 |
| 2011/0037174 A1* | 2/2011 | Nikaido | H01L 21/563 257/737 |
| 2011/0213096 A1* | 9/2011 | Zhu | C08K 5/41 525/404 |
| 2012/0052633 A1* | 3/2012 | Sakemi | H05K 3/305 438/118 |
| 2013/0197129 A1* | 8/2013 | Akiba | H01L 23/295 523/433 |
| 2014/0312511 A1* | 10/2014 | Nakamura | H01L 24/92 257/777 |
| 2016/0066421 A1 | 3/2016 | Kitamura et al. | |
| 2017/0120396 A1 | 5/2017 | Ohashi et al. | |
| 2017/0188468 A1* | 6/2017 | Hino | B23K 35/24 |
| 2018/0229333 A1* | 8/2018 | Hino | C08G 59/4207 |
| 2019/0338092 A1* | 11/2019 | Reit | C08J 5/18 |

FOREIGN PATENT DOCUMENTS

| | | | |
|---|---|---|---|
| CN | 102453340 A | | 5/2012 |
| CN | 103937433 A | | 7/2014 |
| CN | 105290648 A | | 2/2016 |
| CN | 106281171 A | * | 1/2017 |
| CN | 106624452 A | | 5/2017 |
| CN | 107745202 A | | 3/2018 |
| JP | 2002232123 A | | 8/2002 |
| JP | 2008274080 A | | 11/2008 |
| JP | 2008300443 A | | 12/2008 |
| JP | 2011171258 A | | 9/2011 |
| JP | 201643408 A | | 4/2016 |
| JP | 2017119287 A | | 7/2017 |
| JP | 201853057 A | | 4/2018 |

OTHER PUBLICATIONS https://www.chemicalbook.com/ChemicalProductProperty_EN_CB9460153.htm, Chemical Book, 2016 (Year: 2016).*
Rejection Decision from the China National Intellectual Property Administration for related application CN 201980049545.2 dated Apr. 1, 2022 and an English Translation thereof.

* cited by examiner

[FIG. 1]
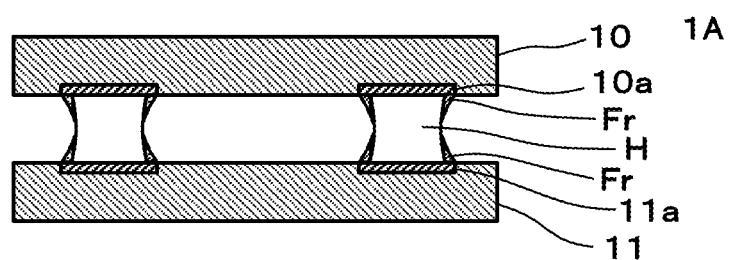
[FIG. 2A]
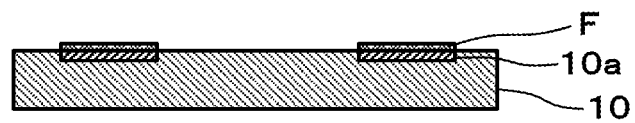
[FIG. 2B]
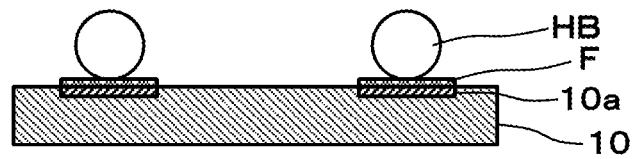

[FIG. 2C]
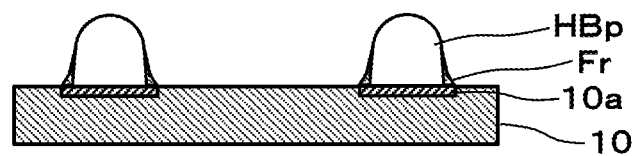
[FIG. 2D]
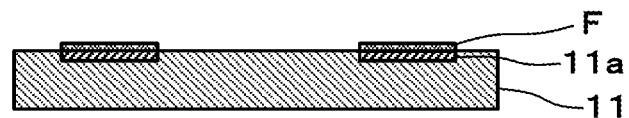
[FIG. 2E]
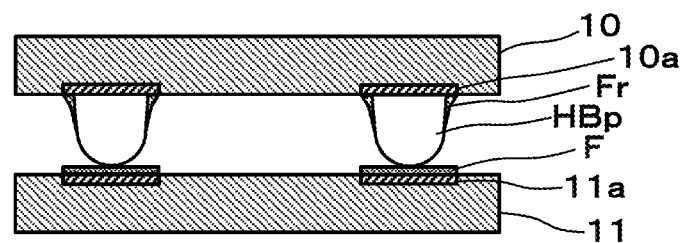

【FIG. 2F】
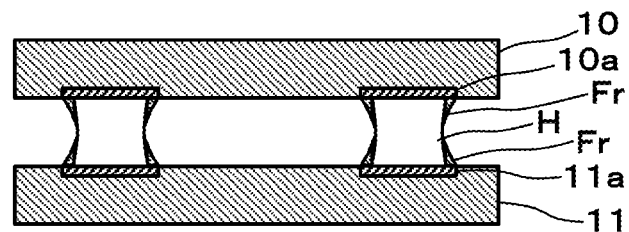
【FIG. 2G】
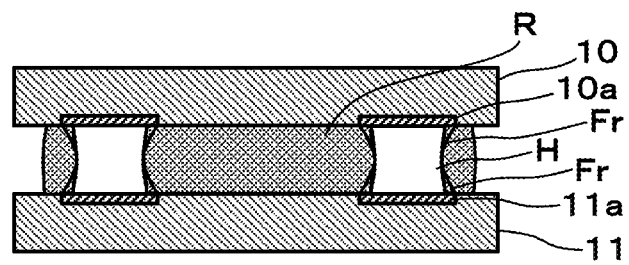

FLUX COMPOSITION, SOLDER PASTE, SOLDER JOINT AND SOLDER JOINING METHOD

CROSS-REFERENCE TO RELATED APPLICATIONS

This application is the United States national phase of International Application No. PCT/JP2019/030153 filed Aug. 1, 2019, and claims priority to Japanese Patent Application No. 2018-151854 filed Aug. 10, 2018, the disclosures of which are hereby incorporated by reference in their entirety.

TECHNICAL FIELD

The present invention relates to a flux composition for use in soldering, and solder paste, a solder joint and a solder joining method, which use the flux composition.

BACKGROUND ART

In general, flux for use in soldering has effects of chemically removing metal oxides which exist on solder and a metal surface of a joint target to be soldered and allowing metal elements to be moved at a boundary between the two. Therefore, by soldering using the flux, an intermetallic compound can be formed between the solder and the metal surface of the joint target, so that strong joint can be obtained.

With recent progress of miniaturization of an electronic component, an electrode that is a soldered site of the electronic component has also become smaller. Therefore, the area that can be joined with a solder alloy is reduced, and the joining strength with the solder alloy alone may be insufficient for joining reliability.

Therefore, up to now, there has been known a mounting technique in which soldering is performed using a flux, and then, after washing and drying steps, a portion to be joined for soldering is sealed with a resin such as an underfill.

Further, recently, there has been focused on a flux composition which contains a thermosetting resin represented by an epoxy resin to give an effect equivalent to resin sealing to a resin composition remaining after soldering.

To a flux composition containing an epoxy resin, a curing agent has been added to accelerate the curing of the epoxy resin. As such curing agents, curing agents such as imidazoles, amines, and phenol novolacs have been known (for example, see Patent Documents 1 and 2). Also, there has been proposed a technique of making electrical connection, without adding an activator, by using a phenol-based curing agent having an activity of chemically removing metal oxides as such a curing agent (for example, see Patent Document 3).

Patent Document 1: JP 2018-53057 A
Patent Document 2: JP 2017-119287 A
Patent Document 3: JP 2002-232123 A

SUMMARY OF THE INVENTION

However, it is difficult for conventional flux compositions containing an epoxy resin and a curing agent such as the imidazoles, the amines and the phenol novolacs to provide effects on all of the printability of whether or not a sufficient amount of the flux composition can be applied, the solderability of whether solder sufficiently spreads by soldering using this flux composition, and the flux residue curability of whether a flux residue sufficiently cures by soldering using this flux composition. In the case of conventional flux compositions containing an epoxy resin and an active phenol-based curing agent, it is necessary to transfer such a flux composition, in a film form, to an electrode or the like, and thus a film formation step is required in advance.

Further, even when an activator such as organic acid is further added to enhance the activity of the flux composition, the activator reacts with the epoxy resin upon heating of the flux composition in the film formation step, which causes a problem such that the activity is lost.

The present invention has been made to solve such problems, and has an object to provide a flux composition that is applicable to an electrode or the like without any film formation step, and solder paste, a solder joint and a solder joining method using the flux composition.

The inventors have found that diallyl bisphenol A, which functions as a curing agent to accelerate the curing of an epoxy resin in a temperature range assumed for soldering, and has an activity and functions as an activator in the temperature range assumed for soldering, gives the flux composition a viscosity that allows it to be applied at room temperature by printing, transfer, or the like.

Thus, the present invention provides a flux composition containing 20 wt % or more and 50 wt % or less of an epoxy resin, 15 wt % or more and 45 wt % or less of diallyl bisphenol A, and 1 wt % or more and 30 wt % or less of organic acid.

The present invention may further contain 0 wt % or more and 10 wt % or less of another phenol-based curing agent, 0 wt % or more and 10 wt % or less of an amine, and 0 wt % or more and 20 wt % or less of a solvent.

The present invention may further contain: 0 wt % or more and 2 wt % or less of an amine hydrohalogenic acid salt, 0 wt % or more and 5 wt % or less of an organohalogen compound, 0 wt % or more and 10 wt % or less or a thixotropic agent, 0 wt % or more and 2 wt % or less of a silane coupling agent, and 0 wt % or more and 2 wt % or less of an antifoaming agent.

Furthermore, the present invention provides solder paste containing a mixture of the flux composition described above and solder powder. Further, the present invention provides a solder joint using the flux composition described above. Furthermore, the present invention provides a solder joining method using the flux composition described above.

A flux composition containing 15 wt % or more and 45 wt % or less of diallyl bisphenol A, 20 wt % or more and 50 wt % or less of an epoxy resin, and 1 wt % or more and 30 wt % or less of organic acid has a viscosity that allows it to be applied by printing, transfer, or the like at room temperature. Thus, it is not necessary to heat the flux composition in the process of applying the flux composition, thereby enabling any reaction between the organic acid and the epoxy resin to be suppressed.

In addition, the diallyl bisphenol A has an activity and functions as an activator in a temperature range assumed for soldering. Thus, solder can be wetly spread by incorporating predetermined amounts of the diallyl bisphenol A and organic acid in the flux composition.

In addition, the diallyl bisphenol A functions as a curing agent that accelerates curing of the epoxy resin in a temperature range assumed for soldering. Thus, the epoxy resin is cured to form a flux residue, so that the portion soldered with solder can be sealed with the flux residue containing the epoxy resin as a main component.

BRIEF DESCRIPTION OF THE DRAWINGS

FIG. 1 is a configuration diagram illustrating an example of a solder joint according to a present embodiment.

FIG. 2A is an explanatory diagram illustrating an example of a solder joining method according to the present embodiment.

FIG. 2B is an explanatory diagram illustrating an example of the solder joining method according to the present embodiment.

FIG. 2C is an explanatory diagram illustrating an example of the solder joining method according to the present embodiment.

FIG. 2D is an explanatory diagram illustrating an example of the solder joining method according to the present embodiment.

FIG. 2E is an explanatory diagram illustrating an example of the solder joining method according to the present embodiment.

FIG. 2F is an explanatory diagram illustrating an example of the solder joining method according to the present embodiment.

FIG. 2G is an explanatory diagram illustrating an example of the solder joining method according to the present embodiment.

DETAILED DESCRIPTION

<Examples of a Flux Composition in Present Embodiment>

A flux composition in a present embodiment may contain diallyl bisphenol A as a phenol-based curing agent. The flux composition in the present embodiment may also contain an epoxy resin and organic acid.

Diallyl bisphenol A is a compound having an allyl group and a phenolic hydroxyl group. Diallyl bisphenol A functions as a curing agent that accelerates curing of the epoxy resin in a temperature range assumed for soldering. Diallyl bisphenol A also has an activity and functions as an activator in the temperature range assumed for soldering. Further, diallyl bisphenol A gives the flux composition a viscosity that allows it to be applied by printing, transfer, or the like at room temperature.

In the case of a flux composition containing a phenol-based curing agent other than diallyl bisphenol A as a curing agent for an epoxy resin, it is necessary to heat the flux composition to form a film in the process of applying the flux composition to a substrate or the like. Upon heating of the flux composition, the reaction between the epoxy resin and the activator is accelerated. Upon reaction between the activator and the epoxy resin, the epoxy resin may be cured before solder wetting. Further, when the activator and the epoxy resin react with each other, the activity of chemically removing metal oxides becomes insufficient, leading to deterioration in solder wettability.

Therefore, the flux composition of the present embodiment may contain 15 wt % or more and 45 wt % or less, preferably 30 wt % or more and 40 wt % or less of diallyl bisphenol A, as a phenol-based curing agent, when the total flux composition is 100.

The flux composition of the present embodiment may contain 20 wt % or more and 50 wt % or less, preferably 25 wt % or more and 45 wt % or less of an epoxy resin. The flux of the present embodiment may also contain 1 wt % or more and 30 wt % or less, preferably 5 wt % or more and 20 wt % or less of organic acid.

Furthermore, the flux composition of the present embodiment may contain another phenol-based curing agent as long as it contains a predetermined amount of diallyl bisphenol A, and it may contain 0 wt % or more and 10 wt % or less of said another phenol-based curing agent.

Also, the flux composition of the present embodiment may also contain 0 wt % or more and 10 wt % or less of an amine; 0 wt % or more and 2 wt % or less of an amine hydrohalogenic acid salt; 0 wt % or more and 5 wt % or less of an organohalogen compound; 0 wt % or more and 10 wt % or less of a thixotropic agent; 0 wt % or more and 2 wt % or less of a silane coupling agent and 0 wt % or more and 2 wt % or less of an antifoaming agent, as other additives; and 0 wt % or more and 20 wt % or less of a solvent.

As the epoxy resin, exemplified are bisphenol type epoxy resins such as bisphenol A type epoxy resin, bisphenol AP type epoxy resin, bisphenol AF type epoxy resin, bisphenol B type epoxy resin, bisphenol BP type epoxy resin, bisphenol C type epoxy resin, bisphenol E type epoxy resin, bisphenol F type epoxy resin, bisphenol G type epoxy resin, bisphenol M type epoxy resin, bisphenol S type epoxy resin, bisphenol P type epoxy resin, bisphenol PH type epoxy resin, bisphenol TMC type epoxy resin, and bisphenol Z type epoxy resin, biphenyl type epoxy resins, diphenyl ether type epoxy resins, naphthalene type epoxy resins, aminophenol type epoxy resins, 3',4'-epoxycyclohexanecarboxylic acid 3,4-epoxycyclohexylmethyl, and the like.

As the organic acid, exemplified are glutaric acid, adipic acid, azelaic acid, eicosane diacid, citric acid, glycolic acid, succinic acid, salicylic acid, diglycolic acid, dipicolinic acid, dibutyl aniline diglycolic acid, suberic acid, sebacic acid, thioglycol acid, isophthalic acid, terephthalic acid, dodecanedioic acid, parahydroxyphenylacetic acid, picolinic acid, phenylsuccinic acid, phthalic acid, fumaric acid, maleic acid, malonic acid, lauric acid, benzoic acid, tartaric acid, tris(2-carboxyethyl)isocyanurate, glycine, 1,3-cyclohexanedicarboxylic acid, 2,2-bis(hydroxymethyl)propionic acid, 2,2-bis(hydroxymethyl)butanoic acid, 2,3-dihydroxybenzoic acid, 2,4-diethyl glutaric acid, 2-quinolinecarboxylic acid, 3-hydroxybenzoic acid, malic acid, p-anisic acid, stearic acid, 12-hydroxystearic acid, oleic acid, linoleic acid, and linolenic acid.

Further, as the organic acid, exemplified are dimer acid obtained by dimerizing monocarboxylic acid, hydrogenated dimer acid which is a hydrogenated product obtained by adding hydrogen to the dimer acid, trimer acid obtained by trimerizing a monocarboxylic acid, and hydrogenated trimer acid which is a hydrogenated product obtained by adding hydrogen to the trimer acid.

As the dimer acid, trimer acid, and hydrogenated products thereof, exemplified are, for example, dimer acid which is a reactive substance of oleic acid and linoleic acid; trimer acid which is a reactive substance of oleic acid and linoleic acid; dimer acid which is a reactive substance of acrylic acid; trimer acid which is a reactive substance of acrylic acid; dimer acid which is a reactive substance of methacrylic acid; trimer acid which is a reactive substance of methacrylic acid; dimer acid which is a reactive substance of acrylic acid and methacrylic acid; trimer acid which is a reactive substance of acrylic acid and methacrylic acid; dimer acid which is a reactive substance of oleic acid; trimer acid which is a reactive substance of oleic acid; dimer acid which is a reactive substance of linoleic acid; trimer acid which is a reactive substance of linoleic acid; dimer acid which is a reactive substance of linolenic acid; trimer acid which is a reactive substance of linolenic acid; dimer acid which is a reactive substance of acrylic acid and oleic acid; trimer acid which is a reactive substance of acrylic acid and oleic acid; dimer acid which is a reactive substance of acrylic acid and linoleic acid; trimer acid which is a reactive substance of acrylic acid and linoleic acid; dimer acid which is a reactive substance of acrylic acid and linolenic acid; trimer acid which is a reactive substance of acrylic acid and linolenic acid; dimer acid which is a reactive substance of methacrylic acid and oleic acid; trimer acid which is a reactive substance of methacrylic acid and oleic acid; dimer acid which is a reactive substance of methacrylic acid and linoleic acid; trimer acid which is a reactive substance of methacrylic acid and linoleic acid; dimer acid which is a reactive substance of methacrylic acid and linolenic acid; trimer acid which is a reactive substance of methacrylic acid and linolenic acid; dimer acid which is a reactive substance of oleic acid and linolenic acid; trimer acid which is a reactive substance of oleic acid and linolenic acid; dimer acid which is a reactive substance of linoleic acid and linolenic acid; trimer acid which is a reactive substance of linoleic acid and linolenic acid; hydrogenated dimer acid which is a hydrogenated product of each of the dimer acids as described above; hydrogenated trimer acid which is a hydrogenated product of each of the trimer acids described above and the like.

As the phenol-based curing agent other than diallyl bisphenol A, phenol novolac curing agents and the like are exemplified.

As the amine, exemplified are monoethanolamine, diphenylguanidine, ditolyl guanidine, ethylamine, triethylamine, ethylenediamine, triethylenetetramine, 2-methylimidazole, 2-indecylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct, 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo [1,2-a] benzimidazole, 1-dodecyl-2-methyl-3-benzylimidazolium chloride, 2-methylimidazoline, 2-phenylimidazoline, 2,4-diamino-6-vinyl-s-triazine, 2,4-diamino-6-vinyl-s-triazine isocyanuric acid adduct, 2,4-diamino-6-methacryloyloxyethyl-s-triazine, epoxy-imidazole adduct, 2-methylbenzimidazole, 2-octylbenzimidazole, 2-pentylbenzimidazole, 2-(1-ethylpentyl)benzimidazole, 2-nonylbenzimidazole, 2-(4-thiazolyl)benzimidazole, benzimidazole, 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-5'-tert-octylphenyl)benzotriazole, 2,2'-methylenebis[6-(2H-benzotriazol-2-yl)-4-tert-octylphenol], 6-(2-benzotriazolyl)-4-tert-octyl-6'-tert-butyl-4'-methyl-2,2'-methylene bisphenol, 1,2,3-benzotriazole, 1-[N,N-bis(2-ethylhexyl) aminomethyl]benzotriazole, carboxybenzotriazole, 1-[N,N-bis(2-ethylhexyl)aminomethyl]methyl benzotriazole, 2,2'-[[(methyl-1H-benzotriazol-1-yl)methyl]imino]bisethanol, 1-(1',2'-dicarboxyethyl)benzotriazole, 1-(2,3-dicarboxypropyl)benzotriazole, 1-[(2-ethylhexylamino)methyl]benzotriazole, 2,6-bis [(1H-benzotriazol-1-yl)methyl]-4-methylphenol, 5-methyl benzotriazole, 5-phenyltetrazole and the like.

The amine hydrohalogenic acid salt as the halogen is a compound obtained by causing an amine and hydrogen halide to react with each other, and aniline hydrogen chloride, aniline hydrogen bromide and the like are exemplified therefor. As the amine of the amine hydrohalogenic acid salt, the above-described amines can be used, and ethylamine, ethylenediamine, triethylamine, methylimidazole, 2-ethyl-4-methylimidazole and the like are exemplified therefor. As the hydrogen halide, hydrides of chlorine, bromine, iodine, and fluorine (hydrogen chloride, hydrogen bromide, hydrogen iodide, and hydrogen fluoride) are exemplified. Moreover, a boron fluoride may be contained in place of, or in combination with, the amine hydrohalogenic acid salt and as the boron fluoride, tetrafluoroboric acid and the like are exemplified.

As the organohalogen compound as the halogen, exemplified are trans-2,3-dibromo-2-butene-1,4-diol, trans-2,3-dibromo-1,4-butenediol, triallyl isocyanurate hexabromide, 1-bromo-2-butanol, 1-bromo-2-propanol, 3-bromo-1-propanol, 3-bromo-1,2-propanediol, 1,4-dibromo-2-butanol, 1,3-dibromo-2-propanol, 2,3-dibromo-1-propanol, 2,3-dibromo-1,4-butanediol, 2,3-dibromo-2-butene-1,4-diol and the like.

As the thixotropic agent, wax-based thixotropic agents and amide-based thixotropic agents are exemplified. As the wax-based thixotropic agents, for example, hardened castor oil and the like are exemplified. As the amide-based thixotropic agents, exemplified are lauric acid amide, palmitic acid amide, stearic acid amide, behenic acid amide, hydroxystearic acid amide, saturated fatty acid amide, oleic acid amide, erucic acid amide, unsaturated fatty acid amide, p-toluenemethaneamide, aromatic amide, methylenebisstearic acid amide, ethylenebislauric acid amide, ethylenebishydroxystearic acid amide, saturated fatty acid bisamide, methylene bisoleic acid amide, unsaturated fatty acid bisamide, m-xylylenebisstearic acid amide, aromatic bisamide, saturated fatty acid polyamide, unsaturated fatty acid polyamide, aromatic polyamide, substituted amide, methylol stearic acid amide, methylol amide, fatty acid ester amide and the like.

As the silane coupling agent, exemplified are vinyltrimethoxysilane, vinyltriethoxysilane, 2-(3,4-epoxycyclohexyl)ethyltrimethoxysilane, 3-glycidoxypropyl methyldimethoxysilane, 3-glycidoxypropyl trimethoxysilane, 3-glycidoxypropyl methyldiethoxysilane, 3-glycidoxypropyl triethoxysilane, p-styryltrimethoxysilane, 3-methacryloxypropyl methyldimethoxysilane, 3-methacryloxypropyl trimethoxysilane, 3-methacryloxypropyl methyldiethoxysilane, 3-methacryloxypropyl triethoxysilane, 3-acryloxypropyl trimethoxysilane, N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, tris-(trimethoxysilylpropyl) isocyanurate, 3-ureidopropyltriethoxysilane, 3-mercaptopropylmethyldimethoxysilane, 3-mercaptopropyltrimethoxysilane, bis(triethoxysilylpropyl) tetrasulfide, and 3-isocyanatopropyltriethoxysilane.

As the antifoaming agent, acrylic polymers, vinyl ether polymers, butadiene polymers, and the like are exemplified.

As the solvent, alcoholic solvents, glycol-ether-based solvents, terpineols, and the like are exemplified. As the alcoholic solvents, exemplified are ethanol, industrial ethanol (a mixed solvent obtained by adding methanol and/or isopropyl alcohol to ethanol), isopropyl alcohol, 1,2-butanediol, isobornyl cyclohexanol, 2,4-diethyl-1, 5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 1,1,1-tris(hydroxymethyl)ethane, 2-ethyl-2-hydroxymethyl-1,3-propanediol, 2,2'-oxybis(methylene)bis(2-ethyl-1, 3-propanediol), 2,2-bis(hydroxymethyl)-1,3-propanediol, 1,2,6-trihydroxyhexane, bis[2,2,2-tris(hydroxymethyl) ethyl]ether, 1-ethynyl-1-cyclohexanol, 1,4-cyclohexenediol, 1,4-cyclohexanedimethanol, erythritol, threitol, guaiacol glycerol ether, 3,6-dimethyl-4-octyne-3,6-diol, 2,4,7,9-tetramethyl-5-decyne-4,7-diol, and the like. As the glycolether-based solvents, exemplified are hexyl diglycol, diethylene glycol mono-2-ethyl hexyl ether, ethylene glycol monophenyl ether, 2-methylpentane-2,4-diol, diethylene glycol monohexyl ether, diethylene glycol dibutyl ether, triethylene glycol monobutyl ether, diethyl diglycol ether and the like.

<Examples of Solder Paste of Present Embodiment>

Solder paste of the present embodiment contains the flux composition described above and metal powder. The metal powder is preferably Pb-free solder, and contains solder powder containing: Sn alone; an Sn—Ag alloy, an Sn—Cu alloy, an Sn—Ag—Cu alloy, an Sn—Bi alloy, an Sn—In alloy, or the like; or a product obtained by adding Sb, Bi, In, Cu, Zn, As, Ag, Cd, Fe, Ni, Co, Au, Ge, P, or the like to any of these alloys.

<Examples of a Solder Joint of Present Embodiment>

FIG. 1 is a configuration diagram illustrating an example of a solder joint according to the present embodiment. A solder joint 1A of the present embodiment uses any of the flux compositions described above, in which an electronic component 10 and a substrate 11 are joined with solder H. In the flux compositions of the present embodiment described above, the epoxy resin is cured and remains after soldering, so that the portion soldered with the solder H is sealed with a flux residue Fr composed of the resin composition formed by curing the epoxy resin.

The solder H utilizes a solder ball made of solder, a core ball in which a core of Cu or the like is covered with the solder, solder paste containing any of the flux compositions and the metal powder made of the solder powder, which are described above, or the like. Here, the solder contains an Sn—Ag alloy, an Sn—Cu alloy, an Sn—Ag—Cu alloy, an Sn—Bi alloy, an Sn—In alloy, or the like; or is a product obtained by adding Sb, Bi, In, Cu, Zn, As, Ag, Cd, Fe, Ni, Co, Au, Ge, P, or the like to Sn alone or any of these alloys.

<Examples of a Solder Joining Method of Present Embodiment>

FIGS. 2A, 2B, 2C, 2D, 2E, 2F, and 2G are explanatory diagrams each illustrating an example of a solder joining method of the present embodiment. First, as shown in step 1 in FIG. 2A, any one of the flux compositions F described above is applied to electrodes 10a of the electronic component 10 by transfer, printing, or the like.

Next, as shown in step 2 in FIG. 2B, solder balls HB each made of the above-mentioned solder are placed on the flux compositions F. Any core balls may be used. Next, as shown in step 3 in FIG. 2C, the solder is melted using a reflow device to form a solder bump HBp on each of the electrodes 10a of the electronic component 10. In the process of forming the solder bump HBp, the epoxy resin in the flux compositions F is cured to form the flux residue Fr.

Next, as shown in step 4 in FIG. 2D, the above-described flux composition F is applied to electrodes 11a of the substrate 11 by transfer, printing, or the like. As shown in step 5 in FIG. 2E, the solder bumps HBp of the electronic component 10 are placed on the flux compositions F applied to the electrodes 11a of the substrate 11.

Next, as shown in step 6 in FIG. 2F, the solder is melted using the reflow device, so that the electronic component 10 and the substrate 11 are joined with the solder H. In the flux compositions of the present embodiment described above, the epoxy resin is cured and remains after soldering, so that the portion soldered with the solder H is sealed with a flux residue Fr composed of the resin composition formed by curing the epoxy resin.

Further, as shown in step 7 in FIG. 2G, a thermosetting resin R such as an epoxy resin is filled between the electronic component 10 and the substrate 11. The resin R is cured by heating, so that the electronic component 10 and the substrate 11 are sealed.

<Examples of Function/Effects of Flux Composition, Solder Paste, a Solder Joint, and a Solder Joining Method of Present Embodiment>

The flux composition containing: 15 wt % or more and 45 wt % or less of diallyl bisphenol A; 20 wt % or more and 50 wt % or less of an epoxy resin; and 1 wt % or more and 30 wt % or less of organic acid has a viscosity that allows it to be applied by printing, transfer, or the like at room temperature.

Thus, it is not necessary to heat the flux composition in the process of applying the flux composition to the electrode 10a of the electronic component 10 and the electrode 11a of the substrate 11 in the solder joining method described above, thereby enabling any reaction between the organic acid and the epoxy resin to be suppressed.

In addition, the diallyl bisphenol A has an activity and functions as an activator in a temperature range assumed for soldering. Thus, by incorporating predetermined amounts of the diallyl bisphenol A and the organic acid into the flux composition, the solder H can wetly spread over the electrode 10a of the electronic component 10 and the electrode 11a of the substrate 11 in the solder joining method described above.

In addition, the diallyl bisphenol A functions as a curing agent that accelerates curing of the epoxy resin in a temperature range assumed for soldering. As a result, in the solder joining method described above, the epoxy resin is cured to form the flux residue Fr, so that the portion soldered with the solder H can be sealed with the flux residue Fr containing the epoxy resin as a main component.

EXECUTED EXAMPLES

Flux compositions of the Executed Examples and the Comparison examples were prepared with the compositions shown in Table 1 below to verify the solderability, printability, and flux residue curability. The composition rates in Table 1 are expressed in wt (weight) % when the total amount of each flux composition is 100. The CAS No. of diallyl bisphenol A disclosed as the phenol-based curing agent in Table 1 is 1745-89-7.

<Evaluation of Solderability>

(1) Verification Method

The solderability was evaluated by applying the flux composition of each of the Executed Examples and the Comparison examples onto a Cu plate, mounting a solder ball on the flux composition applied onto the Cu plate, performing reflow, and then measuring a wetly spreading diameter of solder. In the reflow process, the temperature was increased from 35° C. to 250° C. by 1° C. every second using a reflow device in which the peak temperature was set to 250° C. Heat treatment was performed for 30 seconds after the temperature reached 250° C. The solder ball has a composition expressed as Sn-3Ag-0.5Cu, which contains 3.0 wt % of Ag, 0.5 wt % of Cu, and the balance of Sn (96.5 wt %). The solder ball has a diameter of 0.3 mm.

(2) Criterion of Determination

○: The spreading diameter of the solder was 510 μm or more.

x: The spreading diameter of the solder was less than 510 μm.

<Evaluation of Printability>

(1) Verification Method

Using a metal mask having an opening diameter of 0.24 mm and a thickness of 0.1 mm and a metal squeegee, the flux composition of each of the Executed Examples and the Comparison examples was applied onto a Cu plate, and then the amount of the applied flux composition was measured.

(2) Criterion of Determination

○: The amount of the applied flux was 80% or more.

x: The amount of the applied flux was less than 80%.

<Evaluation of Flux Residue Curability>

(1) Verification Method

After applying the flux composition of each of the Executed Examples and the Comparison examples onto a Cu plate and performing reflow, the flux residue curability was confirmed. In the reflow process, the temperature was increased from 35° C. to 250° C. by 1° C. every second using a reflow device in which the peak temperature was set to 250° C. Heat treatment was performed for 30 seconds after the temperature reached 250° C.

(2) Criterion of Determination

○: The residue was cured (solidified).

x: The residue was uncured (liquid or paste).

<Comprehensive Evaluation>

○: All of the solderability, printability, and flux residue curability were evaluated as ○.

x: Any or all of the solderability, printability, and flux residue curability was/were evaluated as x.

TABLE 1

| Category | Reagent | | Executed Example 1 | Executed Example 2 | Executed Example 3 | Executed Example 4 | Executed Example 5 | Executed Example 6 | Executed Example 7 | Executed Example 8 |
|---|---|---|---|---|---|---|---|---|---|---|
| Phenolic curing agent | Diallyl bisphenol A | | 35 | 45 | 15 | 25 | 30 | 35 | 25 | 35 |
| | Another phenol-based curing agent | Phenol novolac curing agent (solid) | | | | 10 | | | | |
| Epoxy resin | Bisphenol A type epoxy resin | | 40 | 40 | 35 | 40 | 50 | 20 | 35 | 40 |
| Organic acid | Glutaric acid | | 5 | 5 | 5 | 5 | 3.5 | 5 | | 5 |
| | Azelaic acid | | | | | | | | 5 | |
| | Dimer acid | | 10 | 5 | 10 | 10 | 3.5 | 10 | 25 | 1 |
| Amine | Aromatic guanidine | Ditolyl guanidine | 5 | 2 | 5 | 5 | 10 | 5 | 5 | 7 |
| | Imidazole | 2-Indecyl-imidazole | | | | | | | | |
| Halogen | amine hydrohalogenic acid salt | Ethylamine·HBr | | | | | | | | 2 |
| | Organo halogen compound | Trans-2,3-dibromo-2-butene-1,4-diol | | | | | | | | 5 |
| Thixotropic agent | Ester | Hydrogenated castor oil | | | | 5 | | | | |
| | Amide | Bisamide thixotropic agent | | | | 5 | | 5 | | |
| Additive | Silane coupling agent | N-2-(aminoethyl)-3-aminopropyltrimethoxysilane | | | | | | | | |
| | Antifoaming agent | Acrylic polymer | | | | | | | | |
| Solvent | Glycol ether-based | Hexyl diglycol | 5 | 3 | 20 | 5 | 3 | 20 | 5 | 5 |
| Evaluation item | Solderability | | ○ | ○ | ○ | ○ | ○ | ○ | ○ | ○ |
| | Printability | | ○ | ○ | ○ | ○ | ○ | ○ | ○ | ○ |
| | Flux residue curability | | ○ | ○ | ○ | ○ | ○ | ○ | ○ | ○ |
| | Comprehensive evaluation | | ○ | ○ | ○ | ○ | ○ | ○ | ○ | ○ |

| Category | Reagent | | Executed Example 9 | Executed Example 10 | Executed Example 11 | Comparison Example 1 | Comparison Example 2 | Comparison Example 3 | Comparison Example 4 |
|---|---|---|---|---|---|---|---|---|---|
| Phenolic curing agent | Diallyl bisphenol A | | 35 | 35 | 40 | 5 | | 60 | |
| | Another phenol-based curing agent | Phenol novolac curing agent (solid) | | | | | | | 35 |

TABLE 1-continued

| | | | | | | | | | |
|---|---|---|---|---|---|---|---|---|---|
| Epoxy resin | Bisphenol A type epoxy resin | | 40 | 40 | 40 | 60 | 60 | 20 | 40 |
| Organic acid | Glutaric acid | | 5 | 5 | 5 | 5 | 5 | 5 | 5 |
| | Azelaic acid | | | | | | | | |
| | Dimer acid | | 10 | 6 | 10 | 10 | 10 | 5 | 10 |
| Amine | Aromatic guanidine | Ditolyl guanidine | 2.5 | 5 | 5 | 5 | 5 | 5 | 5 |
| | Imidazole | 2-Indecyl-imidazole | 2.5 | | | | | | |
| Halogen | amine hydrohalogenic acid salt | Ethylamine•HBr | | | | | | | |
| | Organo halogen comround | Trans-2,3-dibromo-2-butene-1,4-diol | | | | | | | |
| Thixotropic agent | Ester | Hydrogenated castor oil | | | | | | | |
| | Amide | Bisamide thixotropic agent | | | | | | | |
| Additive | Silane coupling agent | N-2-(aminoethyl)-3-aminopropyl-trimethoxy-silane | | 2 | | | | | |
| | Antifoaming agent | Acrylic polymer | | 2 | | | | | |
| Solvent | Glycol ether-based | Hexyl diglycol | 5 | 5 | 0 | 15 | 20 | 5 | 5 |
| Evaluation item | Solderability | | ○ | ○ | ○ | ○ | ○ | ○ | × |
| | Printability | | ○ | ○ | ○ | ○ | ○ | ○ | × |
| | Flux residue curability | | ○ | ○ | ○ | × | × | × | ○ |
| | Comprehensive evaluation | | ○ | ○ | ○ | × | × | × | × |

Executed Example 1 containing diallyl bisphenol A in an amount of 35 wt % within the range defined in the present invention; an epoxy resin in an amount of 40 wt % within the range defined in the present invention; glutaric acid as organic acid in an amount of 5 wt % within the range defined in the present invention and dimer acid as the organic acid in an amount of 10 wt % within the range defined in the present invention, the total amount of the organic acid falling within the range defined in the present invention; further ditolyl guanidine as an amine in an amount of 5 wt % within the range defined in the present invention; and hexyl diglycol as a solvent in an amount of 5 wt % within the range defined in the present invention, satisfied the above-described criterion of determination in terms of the spreading diameter of the solder and provided a sufficient effect on the solderability. In addition, this example satisfied the above-described criterion of determination in terms of the amount of the applied flux composition, and provided a sufficient effect on the printability. Furthermore, this example satisfied the above-described criterion of determination in terms of the degree of curing of the flux residue, and provided a sufficient effect on the flux residue curability.

Executed Example 2 containing diallyl bisphenol A in an amount of 45 wt % as the upper limit within the range defined in the present invention; an epoxy resin in an amount of 40 wt % within the range defined in the present invention; glutaric acid as organic acid in an amount of 5 wt % within the range defined in the present invention and dimer acid as the organic acid in an amount of 5 wt % within the range defined in the present invention, the total amount of the organic acid falling within the range defined in the present invention; further ditolyl guanidine as an amine in an amount of 2 wt % within the range defined in the present invention; and hexyl diglycol as a solvent in an amount of 3 wt % within the range defined in the present invention, also satisfied the above-described criterion of determination in terms of the spreading diameter of the solder and provided a sufficient effect on the solderability. In addition, this example satisfied the above-described criterion of determination in terms of the amount of the applied flux composition, and provided a sufficient effect on the printability. Furthermore, this example satisfied the above-described criterion of determination in terms of the degree of curing of the flux residue, and provided a sufficient effect on the flux residue curability.

Executed Example 3 containing diallyl bisphenol A in an amount of 15 wt % as the lower limit within the range defined in the present invention; an epoxy resin in an amount of 35 wt % within the range defined in the present invention; glutaric acid as organic acid in an amount of 5 wt % within the range defined in the present invention and dimer acid as the organic acid in an amount of 10 wt % within the range defined in the present invention, the total amount of the organic acid falling within the range defined in the present invention; further ditolyl guanidine as an amine in an amount of 5 wt % within the range defined in the present invention; hydrogenated castor oil in an amount of 5 wt % and a bisamide thixotropic agent in an amount of 5 wt % as thixotropic agents, the total amount of the thixotropic agents falling within the range defined in the present invention; and hexyl diglycol as a solvent in an amount of 20 wt % within the range defined in the present invention, also satisfied the above-described criterion of determination in terms of the spreading diameter of the solder and provided a sufficient effect on the solderability. In addition, this example satisfied the above-described criterion of determination in terms of the amount of the applied flux composition, and provided a sufficient effect on the printability. Furthermore, this example satisfied the above-described criterion of determination in terms of the degree of curing of the flux residue, and provided a sufficient effect on the flux residue curability.

Executed Example 4 containing diallyl bisphenol A in an amount of 25 wt % within the range defined in the present invention; a phenol novolac curing agent as another phenol-based curing agent in an amount of 10 wt % within the range defined in the present invention; an epoxy resin in an amount of 40 wt % within the range defined in the present invention; glutaric acid as organic acid in an amount of 5 wt % within the range defined in the present invention and dimer acid as the organic acid in an amount of 10 wt % within the range defined in the present invention, the total amount of the organic acid falling within the range defined in the present invention; further ditolyl guanidine as an amine in an amount of 5 wt % within the range defined in the present invention; and hexyl diglycol as a solvent in an amount of 5 wt % within the range defined in the present invention, also satisfied the above-described criterion of determination in terms of the spreading diameter of the solder and provided a sufficient effect on the solderability. In addition, this example satisfied the above-described criterion of determination in terms of the amount of the applied flux composition, and provided a sufficient effect on the printability. Furthermore, this example satisfied the above-described criterion of determination in terms of the degree of curing of the flux residue, and provided a sufficient effect on the flux residue curability.

Executed Example 5 containing diallyl bisphenol A in an amount of 30 wt % within the range defined in the present invention; an epoxy resin in an amount of 50 wt % as the upper limit within the range defined in the present invention; glutaric acid as organic acid in an amount of 3.5 wt % within the range defined in the present invention and dimer acid as the organic acid in an amount of 3.5 wt % within the range defined in the present invention, the total amount of the organic acid falling within the range defined in the present invention; further ditolyl guanidine as an amine in an amount of 10 wt % within the range defined in the present invention; and hexyl diglycol as a solvent in an amount of 3 wt % within the range defined in the present invention, also satisfied the above-described criterion of determination in terms of the spreading diameter of the solder and provided a sufficient effect on the solderability. In addition, this example satisfied the above-described criterion of determination in terms of the amount of the applied flux composition, and provided a sufficient effect on the printability. Furthermore, this example satisfied the above-described criterion of determination in terms of the degree of curing of the flux residue, and provided a sufficient effect on the flux residue curability.

Executed Example 6 containing diallyl bisphenol A in an amount of 35 wt % within the range defined in the present invention; an epoxy resin in an amount of 20 wt % as the lower limit within the range defined in the present invention; glutaric acid as organic acid in an amount of 5 wt % within the range defined in the present invention and dimer acid as the organic acid in an amount of 10 wt % within the range defined in the present invention, the total amount of the organic acid falling within the range defined in the present invention; further ditolyl guanidine as an amine in an amount of 5 wt % within the range defined in the present invention; a bisamide thixotropic agent as a thixotropic agent in an amount of 5 wt %; and hexyl diglycol as a solvent in an amount of 20 wt % within the range defined in the present invention, also satisfied the above-described criterion of determination in terms of the spreading diameter of the solder and provided a sufficient effect on the solderability. In addition, this example satisfied the above-described criterion of determination in terms of the amount of the applied flux composition, and provided a sufficient effect on the printability. Furthermore, this example satisfied the above-described criterion of determination in terms of the degree of curing of the flux residue, and provided a sufficient effect on the flux residue curability.

Executed Example 7 containing diallyl bisphenol A in an amount of 25 wt % within the range defined in the present invention; an epoxy resin in an amount of 35 wt % within the range defined in the present invention; azelaic acid as organic acid in an amount of 5 wt % within the range defined in the present invention and dimer acid as the organic acid in an amount of 25 wt % within the range defined in the present invention, the total amount of the organic acid falling within the range defined in the present invention; further ditolyl guanidine as an amine in an amount of 5 wt % within the range defined in the present invention; and hexyl diglycol as a solvent in an amount of 5 wt % within the range defined in the present invention, satisfied the above-described criterion of determination in terms of the spreading diameter of the solder and provided a sufficient effect on the solderability. In addition, this example satisfied the above-described criterion of determination in terms of the amount of the applied flux composition, and provided a sufficient effect on the printability. Furthermore, this example satisfied the above-described criterion of determination in terms of the degree of curing of the flux residue, and provided a sufficient effect on the flux residue curability.

Executed Example 8 containing diallyl bisphenol A in an amount of 35 wt % within the range defined in the present invention; an epoxy resin in an amount of 40 wt % within the range defined in the present invention; glutaric acid as organic acid in an amount of 5 wt % within the range defined in the present invention and dimer acid as the organic acid in an amount of 1 wt % within the range defined in the present invention, the total amount of the organic acid falling within the range defined in the present invention; further ditolyl guanidine as an amine in an amount of 7 wt % within the range defined in the present invention; ethylamine.HBr as an amine hydrohalogenic acid salt in an amount of 2 wt % within the range defined in the present invention; trans-2,3-dibromo-2-butene-1,4-diol as an organohalogen compound in an amount of 5 wt % within the range defined in the present invention; and hexyl diglycol as a solvent in an amount of 5 wt % within the range defined in the present invention, also satisfied the above-described criterion of determination in terms of the spreading diameter of the solder and provided a sufficient effect on the solderability. In addition, this example satisfied the above-described criterion of determination in terms of the amount of the applied flux composition, and provided a sufficient effect on the printability. Furthermore, this example satisfied the above-described criterion of determination in terms of the degree of curing of the flux residue, and provided a sufficient effect on the flux residue curability.

Executed Example 9 containing diallyl bisphenol A in an amount of 35 wt % within the range defined in the present invention; an epoxy resin in an amount of 40 wt % within the range defined in the present invention; glutaric acid as organic acid in an amount of 5 wt % within the range defined in the present invention and dimer acid as the organic acid in an amount of 10 wt % within the range defined in the present invention, the total amount of the organic acid falling within the range defined in the present invention; further ditolyl guanidine as an amine in an amount of 2.5 wt % within the range defined in the present invention and 2-indecylimidazole as an imidazole, which was an amine, in an amount of 2.5 wt %, the total amount of the amines falling within the range defined in the present invention; and hexyl diglycol as a solvent in an amount of 5 wt % within the range defined in the present invention, also satisfied the above-described criterion of determination in terms of the spreading diameter of the solder and provided a sufficient effect on the solderability. In addition, this example satisfied the above-described criterion of determination in terms of the amount of the applied flux composition, and provided a sufficient effect on the printability. Furthermore, this example satisfied the above-described criterion of determination in terms of the degree of curing of the flux residue, and provided a sufficient effect on the flux residue curability.

Executed Example 10 containing diallyl bisphenol A in an amount of 35 wt % within the range defined in the present invention; an epoxy resin in an amount of 40 wt % within the range defined in the present invention; glutaric acid as organic acid in an amount of 5 wt % within the range defined in the present invention and dimer acid as the organic acid in an amount of 6 wt % within the range defined in the present invention, the total amount of the organic acid falling within the range defined in the present invention; further ditolyl guanidine as an amine in an amount of 5 wt % within the range defined in the present invention; N-2-(aminoethyl)-3-aminopropyltrimethoxysilane as a silane coupling agent, which was an additive, in an amount of 2 wt % within the range defined in the present invention and an acrylic polymer as an antifoaming agent, which was an additive, in an amount of 2 wt % within the range defined in the present invention, the total amount of the additives falling within the range defined in the present invention; and hexyl diglycol as a solvent in an amount of 5 wt % within the range defined in the present invention, also satisfied the above-described criterion of determination in terms of the spreading diameter of the solder and provided a sufficient effect on the solderability. In addition, this example satisfied the above-described criterion of determination in terms of the amount of the applied flux composition, and provided a sufficient effect on the printability. Furthermore, this example satisfied the above-described criterion of determination in terms of the degree of curing of the flux residue, and provided a sufficient effect on the flux residue curability.

Executed Example 11 containing diallyl bisphenol A in an amount of 40 wt % within the range defined in the present invention; an epoxy resin in an amount of 40 wt % within the range defined in the present invention; glutaric acid as organic acid in an amount of 5 wt % within the range defined in the present invention and dimer acid as the organic acid in an amount of 10 wt % within the range defined in the present invention, the total amount of the organic acid falling within the range defined in the present invention; and further ditolyl guanidine as an amine in an amount of 5 wt % within the range defined in the present invention; and containing no solvent, also satisfied the above-described criterion of determination in terms of the spreading diameter of the solder and provided a sufficient effect on the solderability. In addition, this example satisfied the above-described criterion of determination in terms of the amount of the applied flux composition, and provided a sufficient effect on the printability. Furthermore, this example satisfied the above-described criterion of determination in terms of the degree of curing of the flux residue, and provided a sufficient effect on the flux residue curability.

On the other hand, Comparison example 1 containing diallyl bisphenol A in an amount of 5 wt % below the range defined in the present invention; an epoxy resin in an amount of 60 wt % beyond the range defined in the present invention; glutaric acid as organic acid in an amount of 5 wt % within the range defined in the present invention and dimer acid as the organic acid in an amount of 10 wt % within the range defined in the present invention, the total amount of the organic acid falling within the range defined in the present invention; further ditolyl guanidine as an amine in an amount of 5 wt % within the range defined in the present invention; and hexyl diglycol as a solvent in an amount of 15 wt % within the range defined in the present invention, satisfied the above-described criterion of determination in terms of the spreading diameter of the solder and provided a sufficient effect on the solderability. This example contained no other phenol-based curing agent, and thus satisfied the above-described criterion of determination in terms of the amount of the applied flux composition, and provided a sufficient effect on the printability. However, the amount of the curing agent was small relative to that of the epoxy resin, and thus this example, even though containing diallyl bisphenol A, did not satisfy the above-described criterion of determination in terms of the degree of curing of the flux residue, and did not provide an effect on the flux residue curability.

Also, Comparison example 2 containing no diallyl bisphenol A, and containing an epoxy resin in an amount of 60 wt % beyond the range defined in the present invention; glutaric acid as organic acid in an amount of 5 wt % within the range defined in the present invention and dimer acid as the organic acid in an amount of 10 wt % within the range defined in the present invention, the total amount of the organic acid falling within the range defined in the present invention; further ditolyl guanidine as an amine in an amount of 5 wt % within the range defined in the present invention; and hexyl diglycol as a solvent in an amount of 20 wt % within the range defined in the present invention, satisfied the above-described criterion of determination in terms of the spreading diameter of the solder and provided a sufficient effect on the solderability. This example contained no other phenol-based curing agent, and thus satisfied the above-described criterion of determination in terms of the amount of the applied flux composition, and provided a sufficient effect on the printability. However, this example did not contain diallyl bisphenol A or any other phenol-based curing agent, and thus, did not satisfy the above-described criterion of determination in terms of the degree of curing of the flux residue, and did not provide an effect on the flux residue curability.

Further, Comparison example 3 containing diallyl bisphenol A in an amount of 60 wt % beyond the range defined in the present invention; an epoxy resin in an amount of 20 wt % within the range defined in the present invention; glutaric acid as organic acid in an amount of 5 wt % within the range defined in the present invention and dimer acid as the organic acid in an amount of 5 wt % within the range defined in the present invention, the total amount of the organic acid falling within the range defined in the present invention; further ditolyl guanidine as an amine in an amount of 5 wt % within the range defined in the present invention; and hexyl diglycol as a solvent in an amount of 5 wt % within the range defined in the present invention, also satisfied the above-described criterion of determination in terms of the spreading diameter of the solder and provided a sufficient effect on the solderability. This example contained no other phenol-based curing agent, and thus satisfied the above-described criterion of determination in terms of the amount of the applied flux composition, and provided a sufficient effect on the printability. However, the amount of the curing agent was large relative to that of the epoxy resin, and thus this example, even though containing diallyl bisphenol A, did not satisfy the above-described criterion of determination in terms of the degree of curing of the flux residue, and did not provide an effect on the flux residue curability.

In addition, Comparison example 4 containing no diallyl bisphenol A; and containing a phenol novolac curing agent as another phenol-based curing agent in an amount of 35 wt % beyond the range defined in the present invention; an epoxy resin in an amount of 40 wt % within the range defined in the present invention; glutaric acid as organic acid in an amount of 5 wt % within the range defined in the present invention and dimer acid as the organic acid in an amount of 10 wt % within the range defined in the present invention, the total amount of the organic acid falling within the range defined in the present invention; further ditolyl guanidine as an amine in an amount of 5 wt % within the range defined in the present invention; and hexyl diglycol as a solvent in an amount of 5 wt % within the range defined in the present invention, satisfied the above-described criterion of determination in terms of the degree of curing of the flux residue and provided a sufficient effect on the flux residue curability. However, this example did not contain diallyl bisphenol A, and thus was insufficient in amount of the activator, and did not satisfied the above-described criterion of determination in terms of the spreading diameter of the solder, and did not provide an effect on the solderability. Also, when the content of another phenol-based curing agent was set to a conventionally required amount because this example did not contain diallyl bisphenol A, the example did not satisfy the above-described criterion of determination in terms of the amount of the applied flux composition, and did not provide an effect on the printability.

From the above, the flux composition containing 15 wt % or more and 45 wt % or less of diallyl bisphenol A; 20 wt % or more and 50 wt % or less of an epoxy resin; and 1 wt % or more and 30 wt % or less of organic acid, and solder paste, a solder joint, and a solder joining method, which use this flux composition, provided a sufficient effect on the solderability. In addition, they provided a sufficient effect on printability. Further, they provided a sufficient effect on the flux residue curability.

These effects were not inhibited even when another phenol-based curing agent, an amine, an amine hydrohalogenic acid salt, an organohalogen compound, a thixotropic agent, and an additive were contained in amounts within the ranges defined in the present invention.

The invention claimed is:

1. A flux composition comprising:
    20 wt % or more and 50 wt % or less of an epoxy resin;
    30 wt % or more and 45 wt % or less of diallyl bisphenol A; and
    1 wt % or more and 30 wt % or less of organic acid.

2. The flux composition according to claim 1, further comprising:
    0 wt % or more and 10 wt % or less of another phenol-based curing agent;
    0 wt % or more and 10 wt % or less of an amine; and
    0 wt % or more and 20 wt % or less of a solvent.

3. The flux composition according to claim 1, further comprising:
    0 wt % or more and 2 wt % or less of an amine hydrohalogenic acid salt;
    0 wt % or more and 5 wt % or less of an organohalogen compound;
    0 wt % or more and 10 wt % or less or a thixotropic agent;
    0 wt % or more and 2 wt % or less of a silane coupling agent; and
    0 wt % or more and 2 wt % or less of an antifoaming agent.

4. Solder paste comprising a mixture of the flux composition according to claim 1 and solder powder.

5. A solder joint formed using the flux composition according to claim 1.

6. A solder joining method, comprising forming a solder joint using the flux composition according to claim 1.

7. The flux composition according to claim 2, further comprising:
    0 wt % or more and 2 wt % or less of an amine hydrohalogenic acid salt;
    0 wt % or more and 5 wt % or less of an organohalogen compound;
    0 wt % or more and 10 wt % or less or a thixotropic agent;
    0 wt % or more and 2 wt % or less of a silane coupling agent; and
    0 wt % or more and 2 wt % or less of an antifoaming agent.

8. Solder paste comprising a mixture of the flux composition according to claim 2 and solder powder.

9. Solder paste comprising a mixture of the flux composition according to claim 3 and solder powder.

10. Solder paste comprising a mixture of the flux composition according to claim 7 and solder powder.

11. A solder joint formed using the flux composition according to claim 2.

12. A solder joint formed using the flux composition according to claim 3.

13. A solder joint formed using the flux composition according to claim 7.

14. A solder joining method, comprising forming a solder joint using the flux composition according to claim 2.

15. A solder joining method, comprising forming a solder joint using the flux composition according to claim 3.

16. A solder joining method, comprising forming a solder joint using the flux composition according to claim 7.

* * * * *